United States Patent [19]

Manea

[11] 4,427,487

[45] Jan. 24, 1984

[54] NOVEL GLUING MACHINE

[75] Inventor: Giuseppe Manea, Marano Vicentino, Italy

[73] Assignee: Off. Mecc. F. lli Manea di Bortolino e Giuseppe Manea & C. s.n.c., Marano Vincentino, Italy

[21] Appl. No.: 370,942

[22] Filed: Apr. 22, 1982

[30] Foreign Application Priority Data

May 26, 1981 [IT] Italy .............................. 85568 A/81

[51] Int. Cl.³ ............................................ B32B 31/04

[52] U.S. Cl. ................................ 156/546; 156/307.5; 156/551

[58] Field of Search ................ 144/346, 348, 350-352; 156/212, 216, 199-202, 196, 307.5, 544-546, 551; 428/528

[56] References Cited

U.S. PATENT DOCUMENTS 2,977,273 3/1961 Korican .............................. 428/528
3,296,056 1/1967 Bechtold ......................... 156/202 X

FOREIGN PATENT DOCUMENTS 1902059 8/1970 Fed. Rep. of Germany ...... 156/551
2320839 11/1974 Fed. Rep. of Germany ...... 156/546

*Primary Examiner*—David A. Simmons
*Attorney, Agent, or Firm*—Bucknam and Archer

[57] ABSTRACT

An automatic continuous gluing machine for the application of the glue onto the border of a panel being coated is described. The machine eliminates the necessity of pregluing the coating strips because it provides for the application of glue both on the panel and onto the strip, while the panel advances along the plane of operation. The machine is provided with lamps and a jet of hot air to heat the panel and the strip respectively, and pressure rollers to hold the panel and strip adhering to each other.

2 Claims, 4 Drawing Figures

NOVEL GLUING MACHINE

The present invention relates to continuous automatic gluing machines and more specifically to machines used for gluing the border strips with a glue containing a polyvinyl compound on the borders of the panels being coated.

One of the novel features of the present invention resides in the fact that the glue is applied by the machine both on the border of the panel being coated, as well as on the interior surface of the coating strip, while both advance on the machine along the respective line of conveyance prior to the time they are subjected to respective pressure, which acts respectively on both of them by means of a plurality of pressure rollers, always along the line of the path of the panel being coated.

Obviously, both the panel being coated, as well as the bordering strip are subjected to heat and specifically the panel is heated for instance by means of lamps and the coating strip is heated by means of a stream of hot air for the purpose of making sure that the glue dries quickly. The glue is previously distributed, both on the panel, as well as the strip in order to make possible the subsequent perfect adhesion of both parts during the step when the pressure is being applied by means of pressure rollers.

The invention will now be described in more detail by reference to the accompanying drawings of which:

Figure 1:
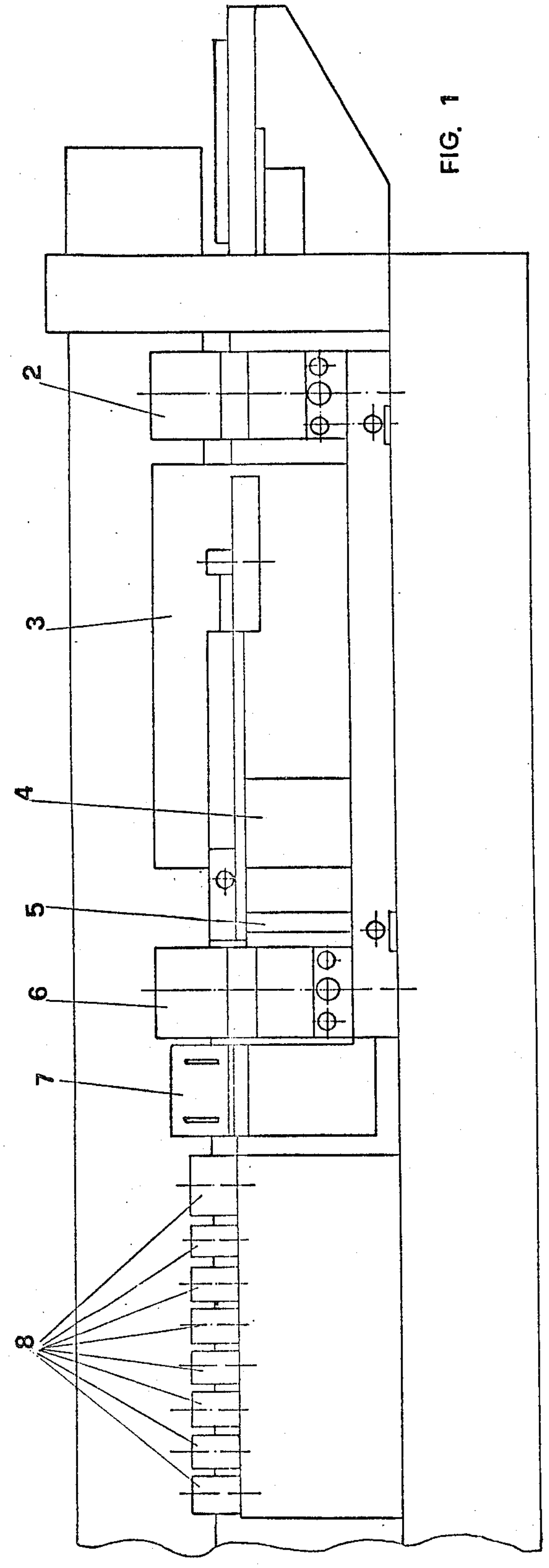
FIG. 1 is an overall schematic front view of the machine of this invention.
Figure 2:
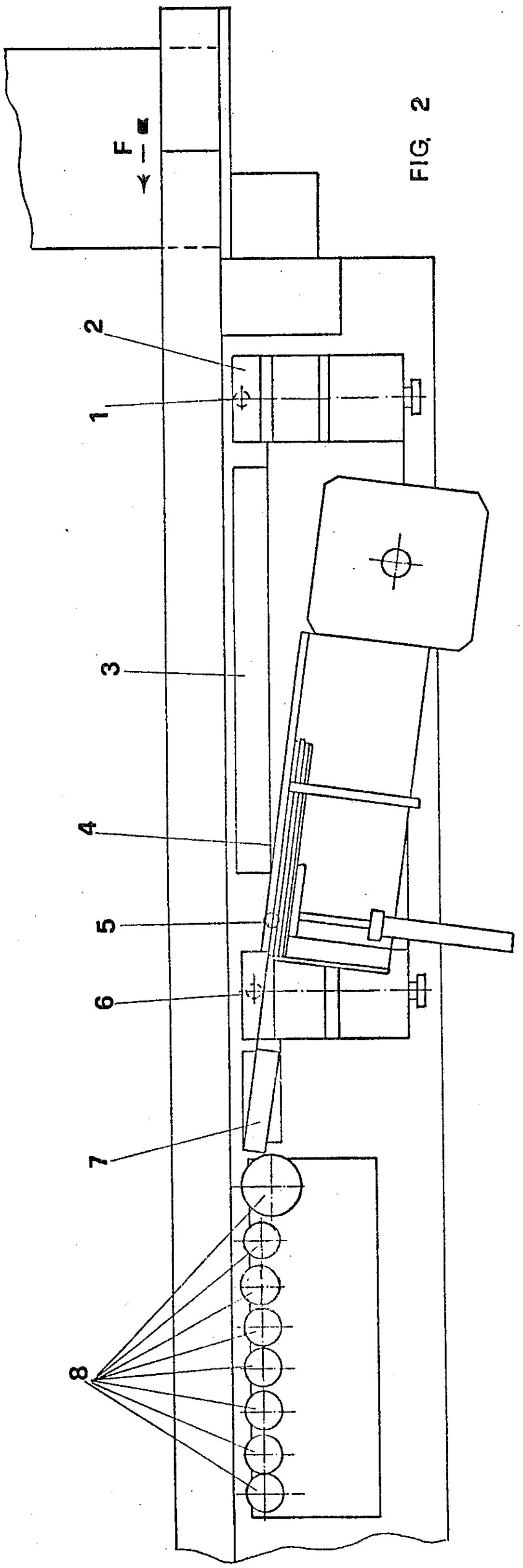
FIG. 2 is an overall schematic top view of the same machine of FIG. 1.

The machine according to the present invention comprises an application roller 1, by means of which glue consisting of a polyvinyl compound is being introduced and applied onto the border of the panel being coated, which panel advances in the direction of the arrow F along the plane of operation of the machine. Roller 1 is provided with its respective container 2, which is used as a reservoir for the glue. The apparatus further comprises a series of lamps used for heating, designated by numeral 3. The lamps heat the border of the panel being coated after the glue has been applied onto the border of the panel. The machine further comprises a supply for the coating strips which are designated by numeral 4 and a needle roller 5 being used to remove the strips one at a time from the supply 4. The machine further comprises a container 6, which is provided with a roller to spread the glue onto the interior surface of the strip, which comes out of the stock 4. Numeral 7 in the figure represents a device for the introduction of hot air, which serves the purpose of drying the glue, as soon as the glue has been applied on the advancing strip and a plurality pressure rollers 8, which compress the coating strip onto the border of the panel being coated.

Figure 3:
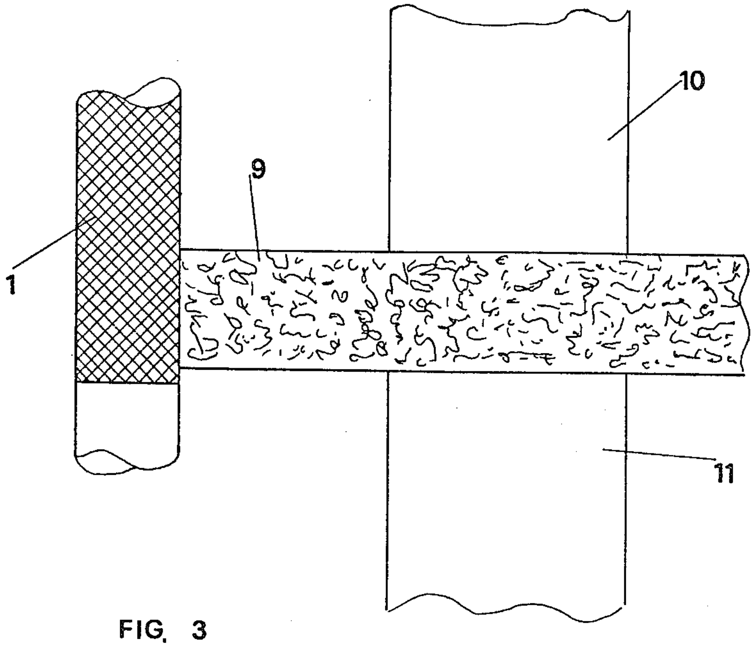
FIG. 3 is a vertical schematic view in section of the roller being used to apply the glue onto the panel.

Advantageously, roller 1, as shown in FIG. 3, is of the type which is provided with a knurled surface, which is used to apply the glue, which contains the polyvinyl compound onto the border of the panel 9, the latter being held during the operation, for instance, by means of a vice, the latter being provided with movable jaws 10 and 11, while the panel advances along the machine.

Figure 4:
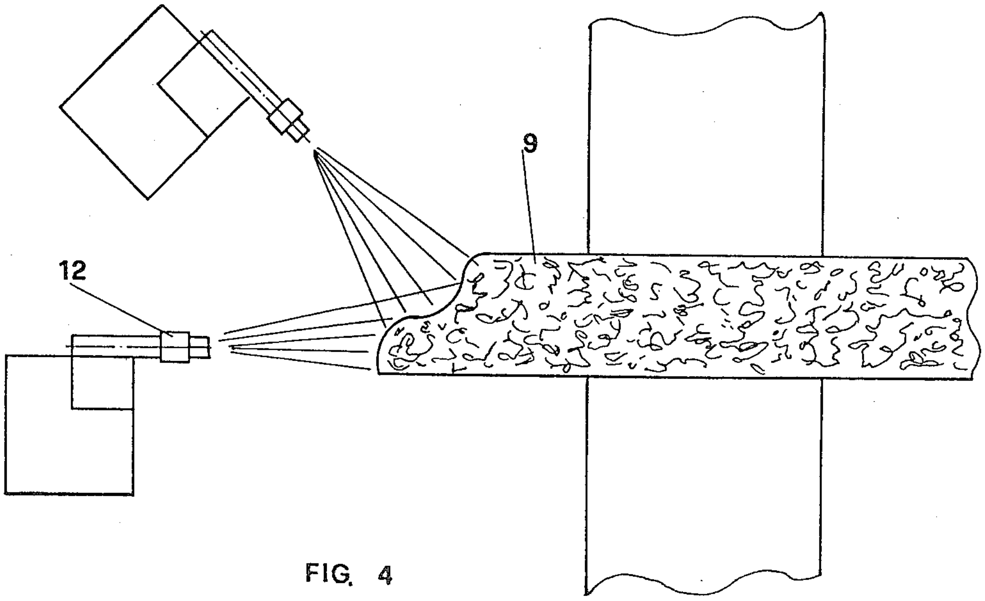
FIG. 4 represents a second embodiment of the machine of the invention being used for the application of glue by spraying, particularly on the shaped border of the panel.

In the embodiment illustrated in FIG. 3, the border of the panel 9 being coated is perfectly plane, while in the embodiment illustrated in FIG. 4, the border of the panel 9 being coated is shaped and in this case, two beaks 12 suitable for spraying are provided, the beaks spraying the glue on the border itself with similar results.

Obviously, the coating strip must be shaped in the same manner as the border being coated on the pressure roller 8, the latter being suitably shaped, the glue being applied onto the coating strip even when the latter presents a planar shape.

The advantages of the machine according to the present invention are clear if one considers that it provides for the application of the glue onto the surface of the strip, which is being applied onto the border of the panel beig coated and, therefore, the necessity of maintaining a reservoir of strips, previously glued on the distribution plane is eliminated, a step which has been necessary with the gluing machines presently used. This has involved substantial difficulties in the separation of the individual coating strips from the package in which they are kept with the possibility of losses of material and waste of time, which facts are not negligible in the operation of the machine.

The necessity of providing a special apparatus for the first step of gluing the coating strips is also eliminated.

Obviously, the particular details of the machine described hereinabove may be modified, provided the essential novel features of the invention are maintained.

What is claimed is:

1. An automatic continuous gluing machine for the application of the glue onto the border of a panel being coated and onto the coating strip to be glued to the panel, which comprises means for advancing the panel, means (1) for the introduction of the glue onto the border of the panel advancing along the plane of operaton of the machine, first means for heating and drying the glue (3), a supply of strips (4), said strips being held on a predetermined plane along the machine, a needle roller for removing the strips one by one, a container (6) for the glue to be applied onto the strips, means for spreading the glue onto the interior surface of the strips, second heating means (7) for drying the glue applied on the strips, a plurality of pressure rollers (8), which hold the strip adhering onto the border of the panel being coated for a period of time sufficient to achieve good adherence between the two parts being glued, wherein the first heating means are lamps and the second heating means comprises a jet of hot air.

2. The machine according to claim 1 wherein the means for applying the glue onto the border of the panel consists of a spray means (12), which supplies the glue on the surface onto which the glue is to be applied.

* * * * *